United States Patent
Hilton et al.

(10) Patent No.: US 6,698,966 B2
(45) Date of Patent: Mar. 2, 2004

(54) FASTENINGS

(75) Inventors: Kevin Hilton, Gateshead (GB); Daniel Martin, Gateshead (GB)

(73) Assignee: Ninaclip, Plc (GB)

( * ) Notice: Subject to any disclaimer, the term of this patent is extended or adjusted under 35 U.S.C. 154(b) by 0 days.

(21) Appl. No.: 09/825,008

(22) Filed: Apr. 3, 2001

(65) Prior Publication Data

US 2001/0010778 A1 Aug. 2, 2001

Related U.S. Application Data

(63) Continuation of application No. 09/284,728, filed as application No. PCT/GB97/02747 on Oct. 17, 1997, now abandoned.

(51) Int. Cl.⁷ ............................. F16B 21/00; F16D 1/00
(52) U.S. Cl. .................... 403/321; 403/322.1; 403/326; 24/616
(58) Field of Search ...................... 403/321, 322.1–325, 403/326–327, 329, 330, 83, 84, 107; 24/616, 615, 323, 313, 171, 194, 618; 297/440.1

(56) References Cited

U.S. PATENT DOCUMENTS

| | | | | |
|---|---|---|---|---|
| 1,429,155 A | * | 9/1922 | Metcalf | 24/313 |
| 3,430,306 A | * | 3/1969 | Tareau | 24/593.1 |
| 4,688,337 A | * | 8/1987 | Dillner et al. | 24/616 |
| 4,713,865 A | * | 12/1987 | Geldwerth | 24/616 |
| 4,813,108 A | | 3/1989 | Geldwerth | 24/616 |
| 4,981,310 A | | 1/1991 | Belisaire | 285/162 |
| 5,086,547 A | * | 2/1992 | Ziemelis | 24/615 |
| 5,152,013 A | | 10/1992 | Johnson | 2/321 |
| 5,548,879 A | | 8/1996 | Wu | 24/625 |
| 5,561,891 A | | 10/1996 | Hsieh | 24/573.1 |
| 5,620,272 A | | 4/1997 | Sheng | 403/96 |
| 5,645,511 A | | 7/1997 | Le Roux et al. | 482/52 |
| 5,765,958 A | | 6/1998 | Lan | 403/97 |
| D410,194 S | | 5/1999 | Hilton et al. | D8/382 |
| 6,035,499 A | * | 3/2000 | Ninomiya | 24/615 |
| 6,059,598 A | | 5/2000 | Yamashita et al. | 439/352 |
| 6,425,139 B1 | * | 7/2002 | Ida | 2/325 |
| 6,478,503 B1 | * | 11/2002 | Cheng | 403/322.4 |

FOREIGN PATENT DOCUMENTS

| | | |
|---|---|---|
| AU | 37227/78 | 6/1978 |
| AU | 11392/83 | 9/1983 |
| AU | 12675/83 | 10/1983 |
| AU | 44700/85 | 1/1986 |
| AU | 57668/86 | 12/1986 |
| AU | 80271/91 | 1/1992 |
| EP | 0 374 070 A | 6/1990 |
| GB | 2 181 179 A | 4/1987 |
| GB | 2 261 608 A | 5/1993 |

* cited by examiner

*Primary Examiner*—John B. Walsh
(74) *Attorney, Agent, or Firm*—Madson & Metcalf

(57) ABSTRACT

A releasable fastener formed of a first, male (2), and second female component (4) is provided. Deformable arms (18) on the male component (2) extend back from the lead edge (14) of the body portion of the male component which is inserted into the female. Wedges (24) on the arms lock in apertures (40) in the second component (4). The gap between the arms (18) and the body portion is closed off by an end cap and grip portions on the arms to prevent trapping of fingers. The fastener is particularly suited to attaching nursery items, such as parasols, to nursery equipment such as pushchairs.

17 Claims, 8 Drawing Sheets

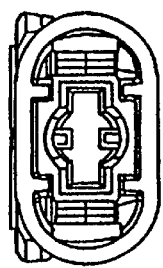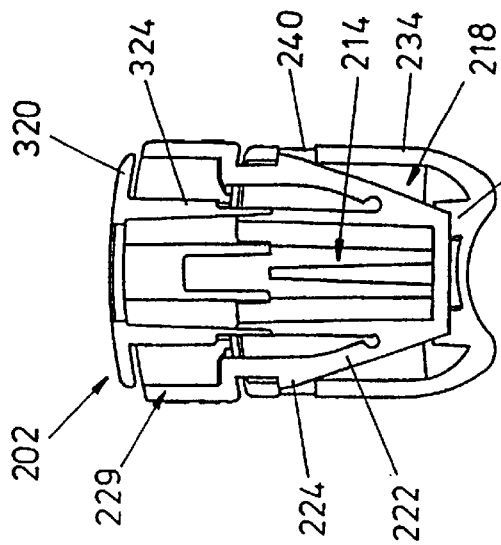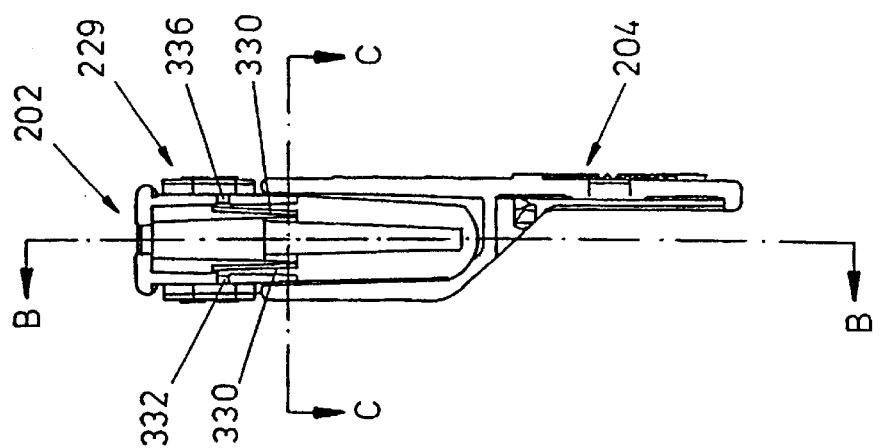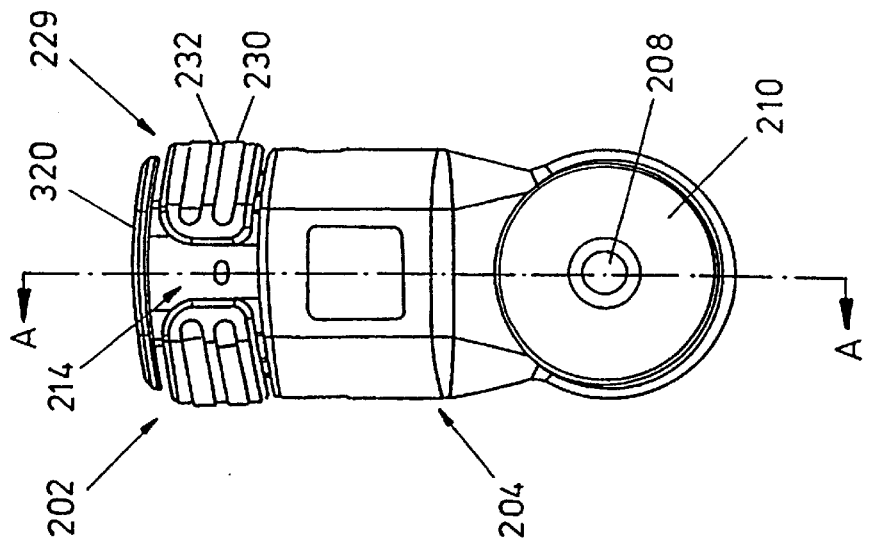

FASTENINGS

This application is a con of Ser. No. 09/284,728 Jun. 21, 1999 abondoned which is a 371 of PCT/GB97/02747 Oct. 17, 1997.

This invention is concerned with improvements in and relating to fastening, particularly but not exclusively in relation to connecting items to another item, for instance in relation to push chairs, other nursery equipment, vehicle seats, items of luggage, strapping, medical and recreational uses.

A large number of fastener types are known, but frequently present difficulties in opening and closing the fastener. Such difficulties are particularly apparent when it is desired to open or close the fastener using a single hand. Many circumstances mean that both hands are not available for operation of a fastener, so presenting a problem to the operator. For example, a mother holding a child will only have one hand free. Similarly a fisherman holding a fishing rod, or a disabled person only having the effective use of one hand, will be presented with a problem where they desire to release or close a fastener to connect one article to another. Many such other examples occur in practice.

Even where two hands are available the release of an article from another article, such as a tray mounted on a chair, may call for two fasteners to be operated simultaneously. Clearly once again single handed and either hand operation is of the utmost importance in such a case.

The present invention aims to provide a fastener meeting such criteria and allowing single handed operation by either hand.

It is also desirable that the fastener be operable from any orientation of the user and with either left or right hand equally. It is the aim of the present invention to provide a fastener equally operable by left or right handed people without requiring a specific orientation of the fastener relative to them.

A range of ancillary products are frequently provided for many items of equipment by manufacturers separate to the manufacturer of that particular piece of equipment. As a result, there is frequently no readily available means for attaching the ancillary products to the equipment and a detachable fastener is required. This is particularly true for car seats for small children, garden furniture and other recreational equipment which lack fasteners for accessories. The present invention addresses this problem and enables accessories to be readily fastened to such equipment by clipping. The accessories might include sun canopies, parasols, covers, umbrellas, trays, toys and the like.

The provision of part of the clip of the present invention as a unit fully incorporated into the original manufacturers equipment is particularly preferred. Significant advantages stem from this and its incorporation in this manner is applicable to car seats for children, garden chairs and the like.

According to a first aspect of the invention we provide a fastener comprising a first component and a second component, the two components having a first released state and a second engaged state, wherein a portion of the first component is deformed relative to the remainder of the component during the transition from first to second state, the deformed portion returning towards its original position in the second state to retain the first and second components together.

Preferably the first component is in the form of a male component. Preferably the second component is in the form of a female component. Preferably a portion of the male component is inserted into the female component in the second state.

Preferably the first component comprises a body portion and one or more dependant arm portions. The arm portions may be integrally formed with the body portion. Most preferably the arm portions depend from one end of the body portion, particularly the end inserted into the second component, the lead end. Preferably two arms are provided, most preferably symmetrically arranged.

The body portion maybe provided with an aperture or recess, preferably in the end opposing the lead end. The aperture or recess may be axially aligned with the direction of insertion and/or retraction of the first and second components relative to one another. The aperture or recess may receive a portion of the item to be fastened. Preferably the first component is fixed to an end of the item or a peripheral portion of the item.

The body portion may be provided integrally with at least a part of the item to be fastened. The body portion and at least part of the item may be simultaneously moulded or otherwise produced.

The body portion may be provided with one or more sides complimentary to contacting sides in the second component. The body portion may provide a rib, preferably one on each side, extending along the insertion and/or retraction direction of movement. The rib may extend laterally. A raised area may be provided by the rib. The width of the rib may increase from a first value at a point near the leading edge to a second value further from the leading edge. One or more protrusions may be provided on one or more sides of the rib. The protrusions may be rounded or elongate.

The arm portions may extend away from the body portion in the first state. The arm portions may extend away from the body portion in the first state to provide a gap into which the arm portions can be deformed. Preferably the body portion is provided with a portion or portions which cover at least a portion of the gap. These portions may comprise extended portions, preferably from the end of the body portion opposing the end of the body portion from which the arms depend. The non-lead end of the gap may be covered by the extended portions. The body portion, arm portion and extended portion may generally define a triangular form. Preferably the extended portions outer limit extends beyond the inner surface of the arm portion, for instance the surface of the arm opposing the body portion.

Preferably the arm portions extend away from the lead edge in the first state. Preferably the arm portions are tapered adjacent to the lead edge.

Preferably the arm portions are provided with grip portions. The grip portions can be used to deform the arm portions away from their first state position. The grip portions may be provided with one or more recesses and/or one or more ribs. The grip portions may extend away from the lead edge and/or away from the arm portions. The grip portions may curve around a portion of the arm portions. The grip portions may be provided beyond the body portion, away from the lead edge. A grip portion may be provided on each arm, most preferably at the end of each arm.

Preferably the arm portions oppose one another. Preferably the arm portions are deformed towards one another. The grip and/or arm portions may all be operated by one hand of the user. Preferably either the right or left hand may successfully be used.

One or more, most preferably all, of the arm portions maybe provided with a second component engagement member or members. Preferably the engagement members are provided on a side of the arm portion away from the body portion, most preferably the opposing side. The engagement members may be provided at an intermediate position on the arm portion, most preferably intermediate of the lead edge and grip portion.

The engagement member may comprise a wedge element. Preferably the wedge element is provided with an inclined face towards the lead edge. Preferably a steep angled trailing face is provided. Preferably the inclined lead face is flush with the adjoining part of the arm portion. Preferably the trailing face is at between 70 and 110° to the adjoining part of the arm portion.

One or more, most preferably all, of the arm portions may be provided with means which cooperate with the body portion, or a portion depending therefrom, of the first component. Preferably the means comprise pin(s) or lug(s) which cooperate with a recess(es) or groove(s). The pins may be elongate. Preferably the pin(s) or lug(s) are provided on the arm portion(s) and the recess(es) or groove(s) are provided on the body portion or portion depending therefrom.

The cooperating means may be provided on a depending portion, such as a second/additional body portion, engaged with the body portion. The engagement may be by means of insertion of a part of the depending portion into an aperture or recess in the body portion or vice versa.

Preferably the pins or lugs depend inwards from the grip portions on the arm portions.

Preferably the lugs or pins are free to move within the recess or groove during deformation of the arm portions away from the first state position to the second state position. Preferably the lugs or pins cooperate or engage with the boundary of the recess or groove to restrain undesired movement of the arm portions away from the body portion, beyond the first state position. In this way attempts to break the arm portions or grip portions off the body portion are restrained.

Preferably the recess or groove is provided with an opening in its periphery corresponding to the position of the lugs or pins in the first and/or second state. In this way the insertion of the lugs into the recess during manufacture can readily be provided for.

Preferably a pair of pins or lugs and a pair of recesses or grooves are provided for one or more arm portions, and most preferably both. Preferably the lugs or pins are provided towards the inner most end of the inside surface of the grip portions.

Preferably at least part of the body portion, and the dependent arms, are provided as an integral component. The integral component may be provided by moulding or casting. Preferably the component is provided of polymeric material. The integral component may further include one or more of the second component engagement member or members and/or body portion co-operating means, such as pins, lugs, grooves or recesses and/or grip portions.

The body portion carrying the dependable arms may be provided as a separate component from the second/additional body portion, carrying the extended gap covering portions. Preferably an element of the first body portion is received within the further body portion or vice versa.

The provision of the components as one or two integral components offers significant advantages in terms of ease of production.

The second component, which may be a female component, preferably comprises an opening or slot into which a portion of the first component can be inserted. Preferably the opening comprises a recess defined by a body member. Preferably the body member extends around the entire recess. Preferably one end of the recess is fully closed off. Preferably one or more sides or parts of the recess are complimentary to the first components body portion.

Preferably the recess is provided with one or more ribs extending away from the lead edge of the second component. Preferably one or more pairs of ribs are provided. Preferably a pair of ribs are provided on two sides, most preferably opposing sides, of the recess. Preferably the ribs are provided on the sides of the recess adapted to receive the first component. Preferably the ribs have a separation complimentary to the portion of the first component they engage, such as the width of the arm portions of the first component and/or the width of the body portion rib(s). Preferably the ribs extend from adjacent to the lead edge of the second component.

Preferably the second component is provided with one or more recesses or apertures. Preferably the recesses or apertures are provided in the body member, most preferably between a pair of ribs. Preferably the recess or aperture is of a size complimentary to the second component engaging member portion of the first component. Preferably the recess or aperture is provided between the lead edge and end of the body member of the second component.

Preferably the second component is provided with a portion adapted to engage a clamp. Preferably the clamp engaging portion extends away from the body portion in a direction away from the lead edge. The clamp engaging portion may comprise a substantially planar member, such as a disc, most preferably a circular disc. The clamp engaging member may be integral with the body portion.

The first or second component may be connected to a clamp. Preferably a releasable connection is provided between the two.

The clamp preferably comprises a pair of jaws, the separation of the jaws being adjustable. The jaws maybe pivotally connected to one another, most preferably at one end. The adjustment of the separation is preferably controlled by an at least partially screw threaded member cooperating with both jaws.

Preferably one or both of the jaws opposing inner faces are provided in the form of a curve. Improved accommodation of the tube may thus be provided. The inner faces may alternatively or additionally be provided with teeth or other protrusions.

Preferably the clamp is attached to the first or second component by engagement of the partially threaded member with that component.

Preferably the transition from first to second state is effected by sliding the first and second components relative to one another. Preferably the relative sliding causes the arm portions to deflect, most preferably towards the body portion. Preferably the deflection is caused by the arm portions abutting the leading edge of the body portion of the second component.

Preferably the arm portions pass between the ribs of the second component during the transition. Preferably the body portion rib(s) passes between a pair of ribs of the second component. Preferably the sides of the ribs engage one another.

Preferably the transition from first to second state brings the second component engagement means or wedge into alignment with the second component aperture or recess.

Preferably the transition from first to second state is achieved by one hand of the user. The hand may be the left or right hand.

Preferably in the second state the wedge engages with the recess or aperture.

Preferably the first component and second component are provided with electrical conductors. Preferably the electrical conductor on the first component is connected to the electrical conductor of the second component in the second state. The first and second components may be provided with a plurality of separate electrical conductors each having a connection between the first and second component. The electrical connection(s) may be provided by a pin and socket engagement, for instance where a pin is received within a correspondingly shaped opening in a cylindrical socket. The electrical connection(s) may be affected through a first deformable electrical conductor abutting a second electrical conductor, the second electrical conductor may also be deformable.

Preferably the contact between the first and second component is provided at the lead edge of the first component and at the bottom of the cup of the second component. A flexible conductor may be attached to the electrical conductor in the first component and/or in the second component. A lead carrying a plurality of electrical conductors may be used in this regard.

The first and/or second components may be lockable in the second state. In this way transition back to the first state may prevented until the lock means are unlocked.

The first component may be locked by movement of a portion thereof, for instance of the body portion, to a position where movement of the dependent arm or arms is restrained. The dependent arm(s) may be restrained directly or via restraint of gripping portions provided on the arm(s).

Movement of the dependent arm or arm(s) may be restrained by providing restraining means in the gap between the body portion and arm portion. In this way the effective gap into which the arm needs to be depressed can be eliminated or reduced to an extent insufficient to disengage the second component engaging means from the second component.

Preferably the restraining means have a first position in which movement of the dependent arm(s) is restrained and a second position in which movement is not restrained. Preferably the transition from first to second position is affected by sliding at least part of the restraining means and/or a portion of the body portion carrying at least part of the restraining means away from the lead edge of the first component. An upwards, sliding motion for the end cap is preferred in this regard.

The restraining means may comprise a element provided on the body portion. The element may be provided on a cap provided on the body portion. The element may be provided on a bar dependent from the cap on the body portion. The element may abut a portion of the arm(s) and/or gripping portion(s) or a further element depending therefrom.

A portion of the restraining means may be provided on or by the arm(s) or gripping portion(s). The component(s) so provided may engage with a part of the body portion of the first component in attempting to move the dependent arms from the engaged to release position. Preferably such restraining means enter a recess or groove with the body portion in the non-restraining position.

The dependent arms may be restrained by providing an element between parts of opposing arms or gripper portions. An element clear of the body may be provided in this regard. In this way the relative movement of the arms or gripper portions towards one another to an extent sufficient to release the first component from the second component is not possible. It is particularly preferred that the element be provided between the gripper portions to the side of the first component.

Preferably restraining means on both sides of the fastener are provided.

The element may comprise an integral part of the body portion. Preferably the element is mounted on the body portion of the first component, for instance via a hinge.

The element may be removed from between the arm(s) or gripper portion(s) by sliding the portion of the body portion carrying the element away from the lead edge of the first component.

The element may be removed from between the arms or gripper portions by rotation of the element about a hinge. The hinge may be provided on the body portion, most preferably on the cap.

Preferably the transition from first to second state is reversible. Preferably the arm portions, and most preferably both, must be deflected to allow the reversal. Preferably the arm portions are deformed by the user applying a force to the arms, most preferably a force applied to the grip portions. Preferably the deformation of the arm portions is maintained whilst the wedge and aperture/recess are disengaged. The deformation may be maintained through out the reversal.

Preferably the transition from second to first state is achieved by one hand of the user. The hand may be the left or right hand.

The first or second component may be provided as an integral part of the structure. The structure maybe an item of nursery equipment such as a high chair, pushchair, playpen or the like. The structure maybe of metal or plastics tubes.

The first or second component maybe provided recessed partially or completely within the structure. Preferably the second component is recessed partially or completely within the structure. Preferably a collar surrounds the recess in the second component, the collar providing a transition surface between the lead edge of the second component and the structure. Preferably the second component is retained within an aperture in the structure, most preferably by a snap fit.

Two or more of the components may be provided within the structure such as a nursery item. The components maybe symmetrically positioned on opposing sides of a structure, for instance around a chair or cot.

According to a second aspect of the invention we provide a first component of a fastener system.

The first component may have features specified for it in the first aspect of the invention and/or elsewhere in this application. p According to a third aspect of the invention we provide a second component for a fastener system.

The second component may have features specified for it in the first aspect of the invention and/or elsewhere in this application.

According to a fourth aspect of the invention we provide the use of a fastener for attaching an element to nursery equipment in which the fastener is provided according to the first aspect of the invention.

The element may comprise a support or carrying element for one or more of, a parasol, umbrella, rainshield, windshield, cover, table structure, toy or toy array.

The nursery equipment may be a play pen, high chair, car seat or the like. Most preferably the nursery equipment is a push chair or other form of child carrier.

According to a fifth aspect of the invention we provide a method of fastening one component of a fastener to another, for instance for fastening an item to nursery equipment, in which the fastener is provided according to the first and/or second and/or third aspects of the invention or following the use of the fourth aspect of the invention.

According to a sixth aspect of the invention we provide a method of fastening, for instance for an item to nursery equipment, in which one component of the fastener is provided on the item and another component of the fastener is provided on the article, for instance nursery equipment, or another component of the fastener is provided on another part of the item, the fastener having a first released state and a second engaged state, wherein a portion of a first component is deformed relative to the remainder of the first component during the transition from first to second state, the deformed portion returning towards its original position in the second state to retain the first and the other component together.

Preferably the method includes inserting a portion of the first component into the second component in the transition towards the second state.

Preferably the retaining in the second state is provided by engagement of a portion of the first component with a portion of the second component.

Preferably the transition from first to second state is effected by means of a sliding motion.

Preferably the transition from second to first state is affected by a sliding motion. Preferably the transition from second to first state requires application of a force by the user to deform the portion of the first component relative to the remainder of the component. Preferably the deformation is required until the portion of the first component engaging the portion of the second component is removed to a location away from that portion of the second component. Preferably a sliding motion only is sufficient to continue the transition from second to first state following disengagement.

Preferably the deformed portion has a first position prior to deformation and moves towards a second position during the deformation. Preferably the fastener is provided with means to restrain movement of the deformed portion, in a direction opposite to deformation from the first to second position, beyond the first position. In this way undesirable application of force to the deformed portion and potential breakage can be avoided.

Preferably the restraint is provided by abutment of a portion on the deformed portion with a portion on the non-deformed portion of the first component.

According to a seventh aspect of the invention we provide a fastener comprising a first component releasably engageable with a second component, wherein a portion of the first component is deformed by a single hand of the operator in effecting the engagement release.

The fastener may incorporate other features and manners of operation described elsewhere in this document.

Preferably the release may be effected by the left or right hand of the operator. Success may be achieved with each due to the symmetrical nature of the fastener.

The first component may be engaged with the second component by a single hand of the operator. Left or right hands may be used. Preferably a sliding engagement is applied.

Various embodiments of the invention will now be described, by way of example only, and with reference to the accompanying drawings in which.

Figure 1:
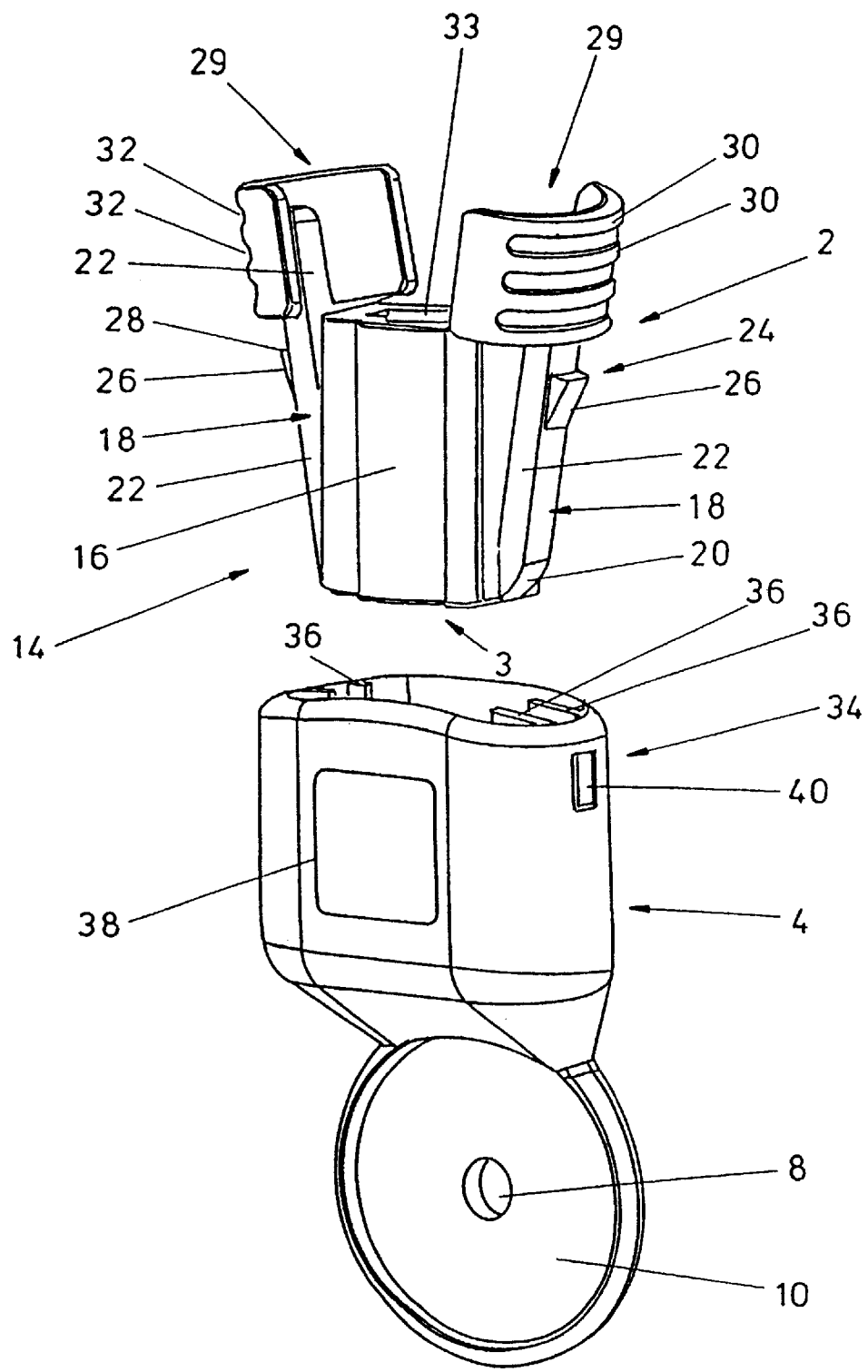
FIG. 1 illustrates a perspective view of a first embodiment of the fastener.
Figure 6:
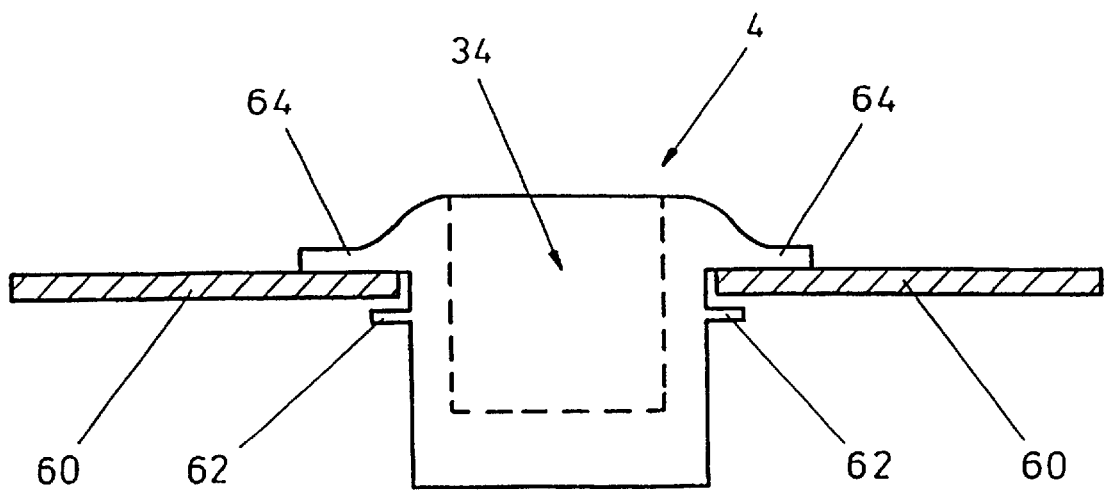
Figure 3:
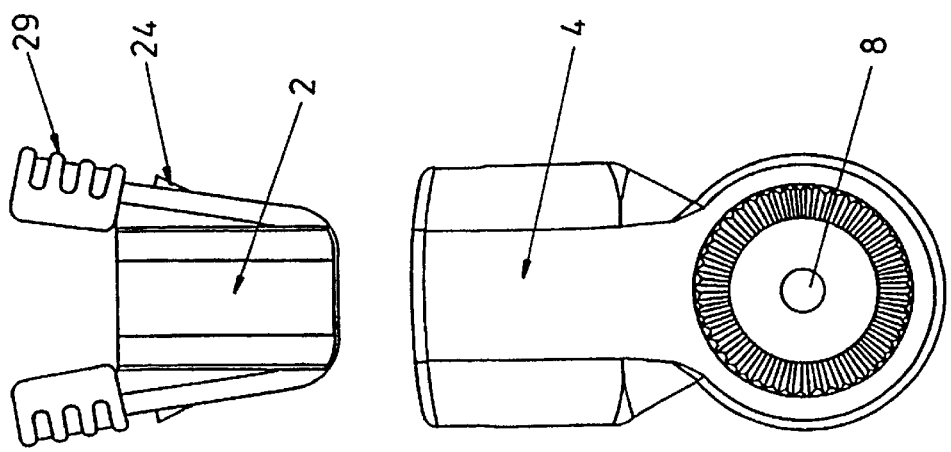
Figure 4:
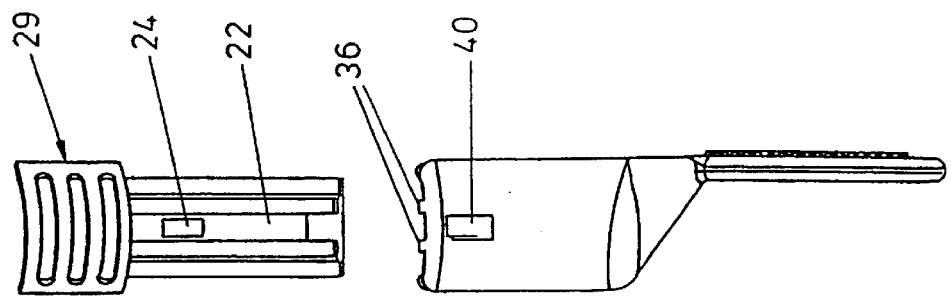
Figure 5:
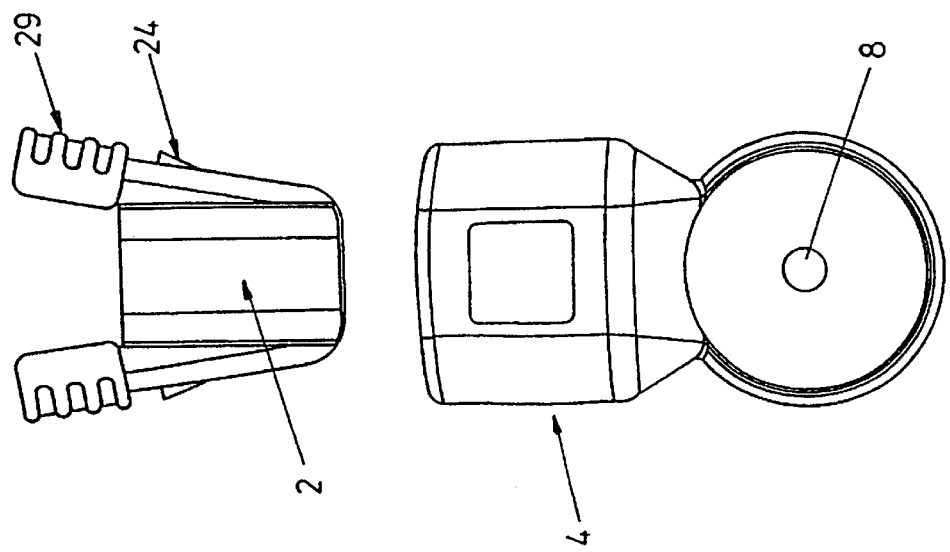
Figure 7:
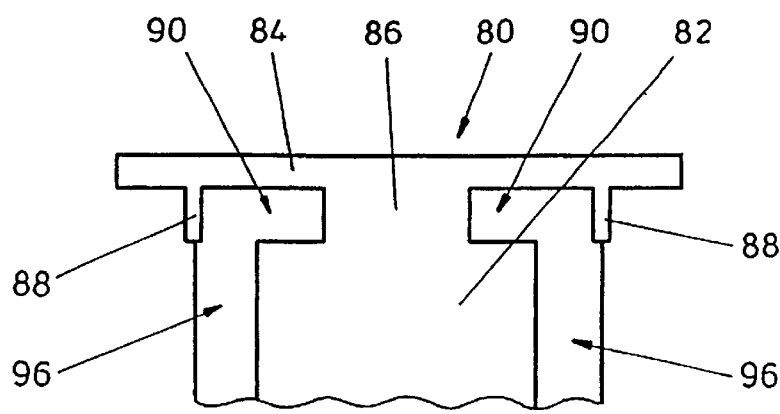
Figure 8:
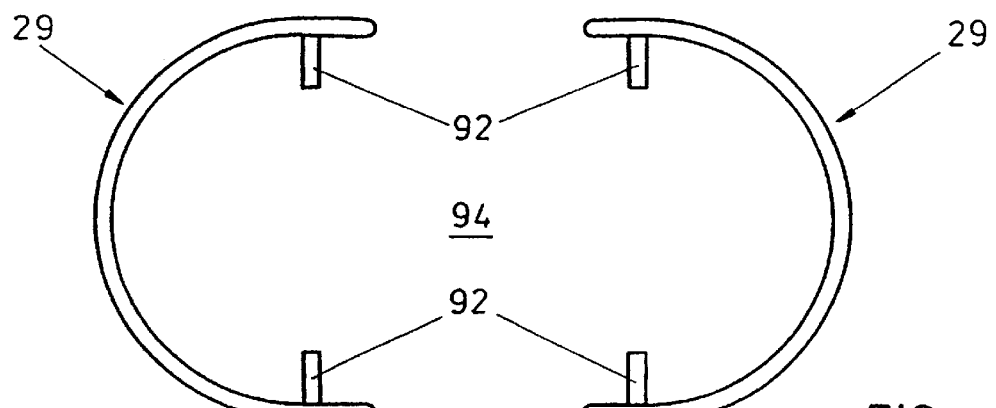
Figure 9:
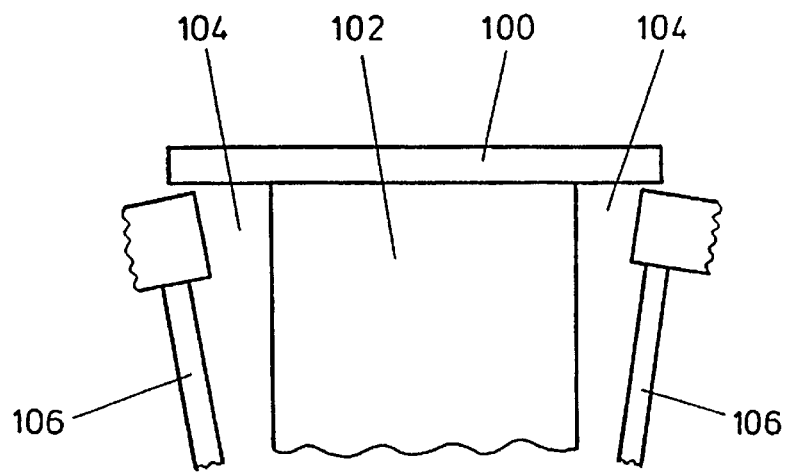
Figure 14:
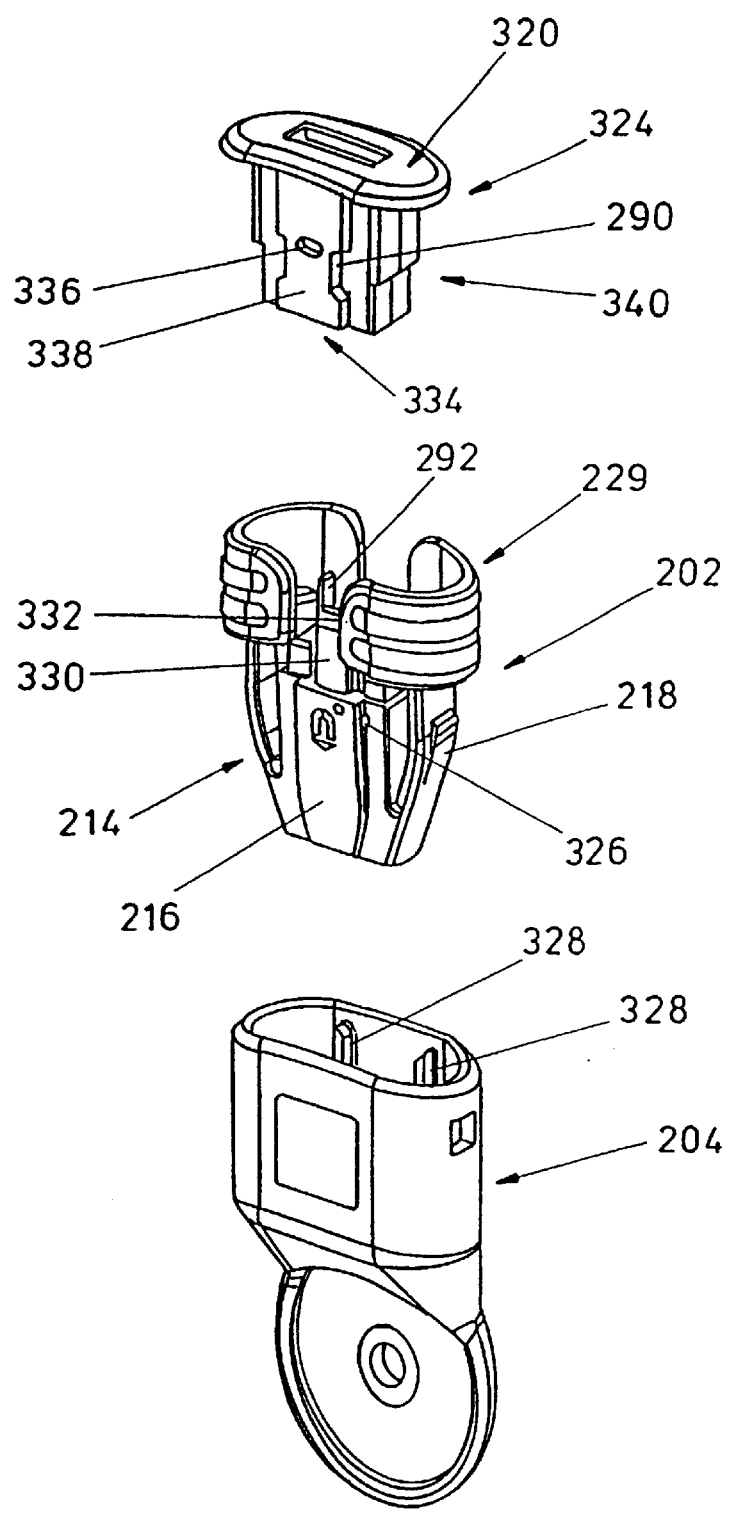
Figure 15:
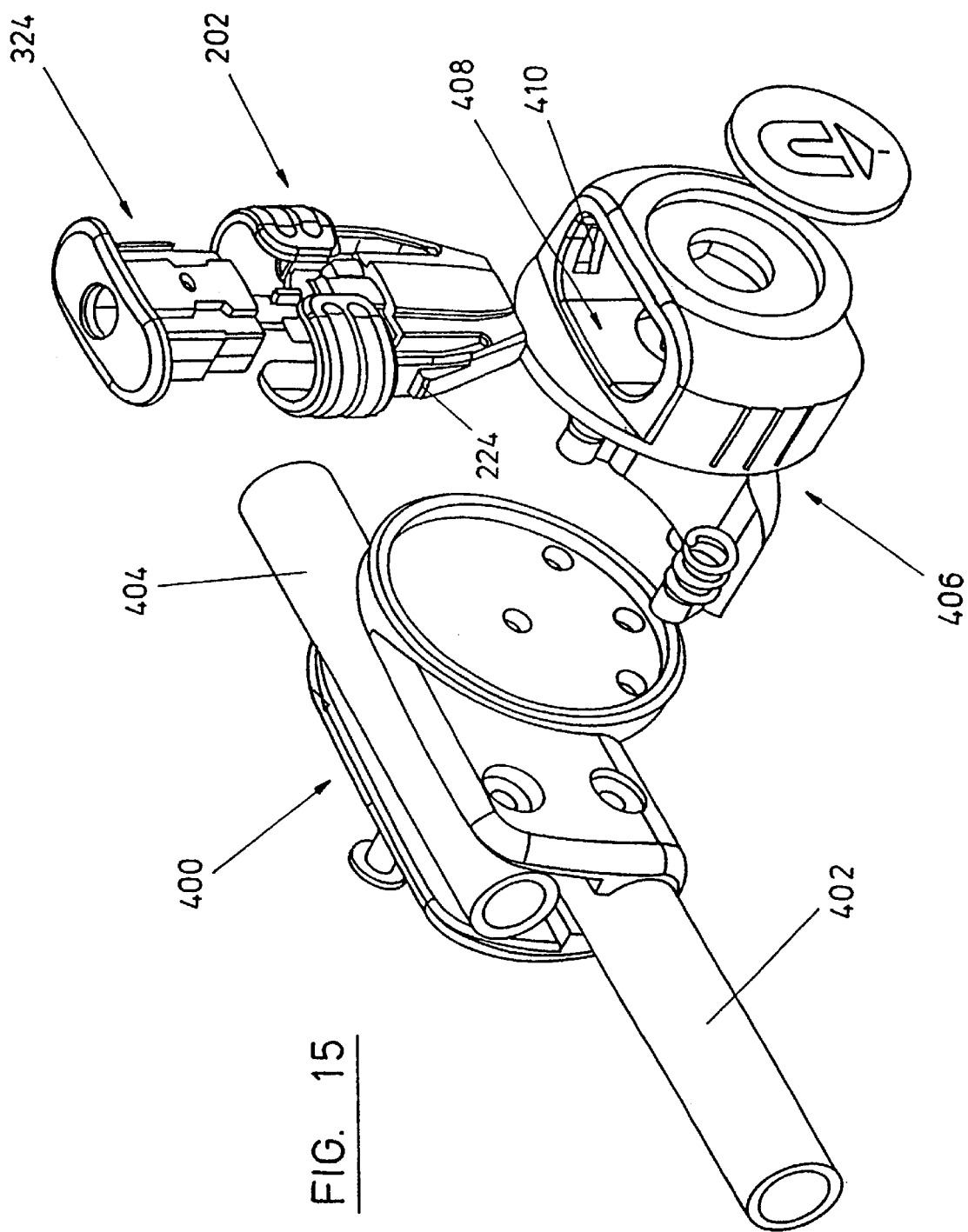

FIG. 3 provides a front view of the fastener of FIG. 1;

FIG. 4 provides a side view of the fastener of FIG. 1;

FIG. 5 provides a rear view of the fastener of FIG. 1;

FIG. 6 illustrates a schematic sectional view of a second component of a second embodiment of a fastener according to the invention;

FIG. 7 illustrates a partial view of a component inserted into the body portion of the male part of a fastener according to the invention;

FIG. 8 illustrates a plan view of the gripping portions provided on the arm portions of a male part of a fastener for cooperating with the component of FIG. 7;

FIG. 9 illustrates a partial view of a further embodiment of a fastener according to the invention;

FIG. 10 is a front view of a fastener according to a further embodiment;

FIG. 11 is a cross sectional view of the fastener of FIG. 10 along section line AA;

FIG. 12 is a cross sectional view of the fastener of FIG. 11 along section BB;

FIG. 13 is a plan cross sectional view of the fastener of FIG. 10 along section CC;

FIG. 14 is an exploded perspective view of the fastener of FIGS. 10 to 13;

FIG. 15 is an exploded perspective view of a further embodiment of the fastener illustrating an integral female component; and FIGS. 16a to 16e are partial perspective views of the male and female components with various tamper resistant means.

A wide variety of equipment and articles require fastening of one component to a separate component, or a different portion of the same component. Without restricting the potential applications of the fastener provided by this invention, its use and structure will be illustrated principally using its application to pushchairs and the like.

Modern pushchairs and a variety of other structures are formed of tubular frames to provide the desired configuration as a resilient structure. Whilst different makes and even products within the same range may have a tubular framework they frequently involve different diameters and cross-sections of tubes.

The user of a pushchair needs to be able to attach a variety of additional items to the pushchair quickly and on repeated occasions. Such accessories might include a parasol, rain shield, rack of toys or the like.

Due to the tubular nature and/or varying size of the basic frame fasteners to date have generally consisted of a pair of jaws with a screw threaded member allowing adjustment of the jaws relative to one another to clamp onto the tube. Due to the high level of gripping force which is necessary to firmly fix the clamp on the tube and prevent it rotating, particularly as the items mounted thereon will extend some way away giving it great leverage, the clamp requires significant force to tighten it. This functional requirement also tends to mean the clamp member is a relatively large component. A number of such clips may be needed for large items such as rainhoods.

Frequent release and refastening of such clamps is time consuming and difficult to perform. This is particularly so in the case of a pushchair as care must simultaneously be taken of one or more small children.

FIG. 1 shows two of the components involved in the fastening of an item of interest to the pushchair, the male component 2 and the female component 4, according to the present invention.

Figure 2:
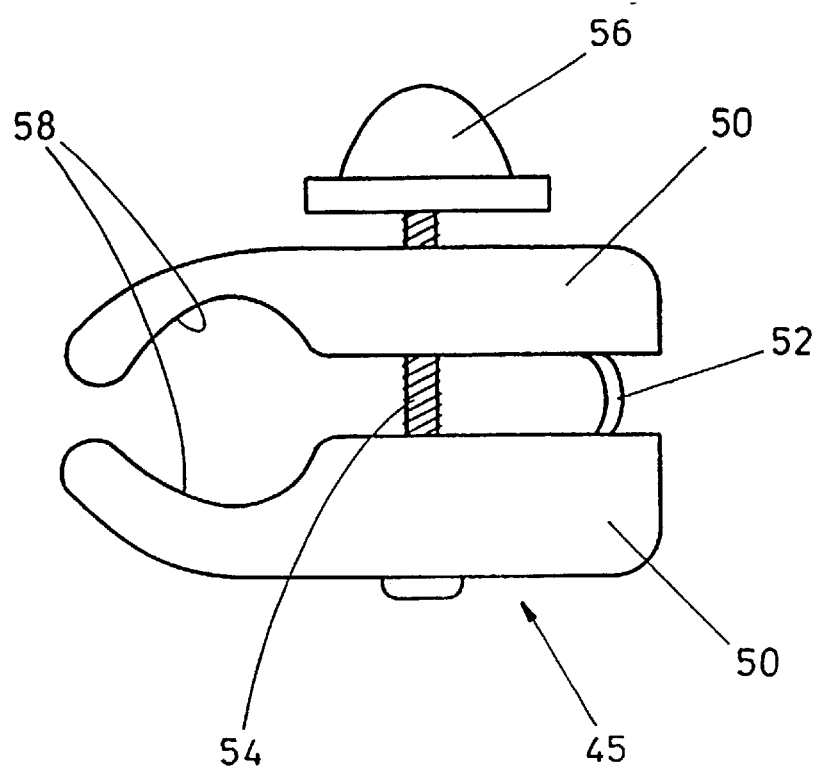
FIG. 2 illustrates a jaw clamp for use with the fastener of FIG. 1.

The female component 4 is attached to a releasable jaw clamp 45, FIG. 2 by means of the aperture 8 in disc portion 10 which receives the threaded adjustment member 54 of the jaw clamp 45.

The male component 2 consists of a hollow body portion 14 with a curved bulge 16 on the front and rear faces. Depending from the end of the body portion 14 at the sides are two arms 18.

The arms 18 are formed with a tapering lead edge 20 and stem portions of constant cross-section 22. The stem portions 22 carry a wedge element 24 with a tapered lead face 26 and rear face 28 squared off to the stem 22. The trailing edge of the stem 22 carries grip portions 29. The grip portions 29 extend in a curve about the ends of the stems 22 and also extend beyond the stem ends away from the lead edge. The gripper portions 29 are provided with a series of ribs 30 and recesses 32 to assist in gripping by the user.

The aperture 33 provided in the hollow body is used to accept and engage with, directly or indirectly, the ends of the items to be fastened. The engagement is intended to be semi-permanent with the male component 2 being retained on the item's end whilst away from the fastener. The item may be the end of an elongated element, such as a parasol stem, or one end of a support frame for a wind or rain shield. The item may alternatively be a table, rack of toys or a mounting point for a bag or other item to be hung from the unit, the item being provided with a male component 2 of the type outlined.

The female component 4 is provided in the general form of a cup 34, defining a hollow interior, and a disc portion 10 extending from it. The disc portions engagement, through aperture 8, allows it to rotate relative to the clamp member, FIG. 2, and so adapt to a number of different positions/inclinations.

The cup 34 is provided with a pair of ribs 36 on either inside side. The ribs 36 are spaced from one another by a distance slightly in excess of the width of stem portions 22 of the male component 2. Within the groove 38 formed by the ribs 36 the female component 4 has two apertures 40. The apertures 40 are elongate and pass through the full depth of the cup 34 wall. Inside the cup 34 the female component 4 is provided with a stop member, not shown.

The clamp member 45 illustrated in FIG. 2 consists of a pair of articulated jaws 50 pivotally joined about a common axis 52. The two jaws are bridged by a screw threaded member 54 which ends in an adjustment knob 56. The inner surfaces 58 of the jaws 50 are curved to correspond in profile to a range of tube diameters with which they are intended to cooperate.

In use on the first occasion the female component 4 is fastened to the clamp member 45 by passing the threaded member 54 through the aperture 8 and fastening on the knob 56. The jaws 50 of the clamp member are then expanded to a width sufficient to enable the clamp member 45 to be placed over the tube. With the tube between the jaws 50, the knob 56 is turned and the separation of the jaws 50 reduced to clamp the member to the tube. The knob 56 is tightened as much as possible to restrict rotation of the clamp 45 relative to the circular cross-sectioned tube. Rotation is particularly prevalent in use due to the leverage arising from the distance the items to be fastened extend from the clamp member 45.

Once fastened at the desired location on the tube the male component 2 can be introduced to the female component 4, FIG. 1. The leading edge 3 of the body portion 14 is inserted in to the cup 34. The ribs 36, stem portions 22 and curved surfaces 16 on the body portion 14 cooperate to guide the male component 2 into the female component 4. The confines of the cup 34 and particularly the grooves 38 cause the stem portions 22 to be deflected towards the body portion 14 of the male component 2.

Continued insertion causes continued deviation with the leading edge 26 of the wedge member 24 sliding over the leading edge of the cup 34. Eventually the trailing edge 28 of the wedge portion 24 clears the top edge of the aperture 40 in the cup. The resilient nature of the arms 22 causes these to expand outward once more engaging the apertures 40. Careful configuration of the stop member in the bottom of the cup 34 ensures that further insertion is prevented by this. In the engaged state withdrawal of the male component from the first is prevented by the engagement of the aperture 40 with the trailing face 28 of the wedge member 24. A firm engagement is thus provided.

On future occasions where the item to be fixed needs to be swapped with another or merely removed to storage the male component 2 only is disengaged from the female component 4. The female component 4 is left firmly in position on the clamp member 45, still attached to the tube/frame/support.

The male 2 and female 4 components are disengaged by the user pushing the gripper portions 29 towards one another. Whilst the extent they can be moved is restricted by their engagement with the body member 14, the movement is sufficient to withdraw the wedge member 24 from the aperture 40 in the cup 34.

With the gripper portions 29 still pushed together it is then possible to remove the male 2 from the female component 4. The next item or the same item again can then be reinserted as above by merely pushing it into the cup 34.

The opposing nature of the two arms ensure that the clip can readily be operated with one hand. The grip portions 29 can be deformed by a finger and thumb of a single hand with the weight of the item to which the female component is attached keeping it in position. The symmetrical nature of the male clip and ease of access to the grip portions 29 also mean that the clip can readily be operated by both left and right hands equally.

In an alternative embodiment to the structure outlined above the female component may be provided without the clamp member. As shown in FIG. 6 the female component 4 can be provided as an integral part of the tube 60 forming the article to which the item is to be attached. The female component 4 has the same basic structure as outlined above but the component is recessed into the tube 60.

The tube 60 is provided with an aperture during its construction and the female component 4 is slotted into it during manufacture. The female component 4 is provided with a snap fit engagement with the tube due to flexible ribs 62 which are pushed beyond the thickness of the tube material. To provide a smooth fit and avoid egress of moisture and the like into the tube 60 the top of the female portion 4 is provided with a laterally extending collar 64. Such structures are particularly suitable for recessing into the sides of child car seats, garden furniture, golf bags and the like.

The internal structure of the female member, including cup 34, and the structure of the male component are as outlined above.

In a further alternative embodiment, not shown, it is of course possible to provide the male component as an integral part of the tube or attached to a clamp on the tube, with the female component being separate and carrying the item to be attached.

Some products, and in particular nursery products have a limited period in which they are useful to the purchaser as the child grows out of the equipment. Once the useful life of the product has been completed, from the users point of view, there is a tendency to try and break parts of the unit and blame it on faulty manufacture with a view to obtaining a refund of the cost of the unit.

To resist attempts at breaking the arm portions 18 from the body portion 14 the following system may be employed, as illustrated in FIGS. 7 and 8.

FIG. 7 illustrates an additional component 80 which can be inserted into the top of the hollow body portion 14 illustrated in FIG. 1. A protrusion, not shown, on this additional component 80 is slidably received in aperture 33 of the hollow body portion 14. An adhesive or other permanent fixing or releasable fixing can be provided to restrain the two components in position relative to one another.

The upper part of the additional component 80 is provided with a curved bulge 82 which corresponds in profile to the curved bulge 16 provided on the body portion 14. This portion tapers into an upper flange like element 84. A narrower neck portion 86 is provided as the transition between portion 82 and portion 84. These three components, in conjunction with wall portions 88 define rectangular recesses 90.

The gripper portions 29 on the arm portions 18, FIG. 8, are provided with a pair of pins or lugs 92 on their inner surface near the inside ends of these surfaces.

During assembly of the fastener the additional component 80, shown in side view in FIG. 7, is slid down through space 94, shown on the plan view of FIG. 8, between the gripper portions 29 and into the aperture 33 in the hollow body portion 14, FIG. 1. This sliding movement results in the lugs 92 moving up over the recessed side portions 96 of the additional component 80 and eventually into the recesses 90.

The recesses 90 are shaped so as to allow the deformation of the arm portions, and as a consequence the lugs, together as is required during the insertion and release of the male component 2 from the female component 4.

Any attempt to increase the separation of the arm portions 18 from the body portion 14 is, however, resisted by the engagement of the lugs 92 with the walls 88 at the end of the recesses. Significant additional strength is thus provided to the clip.

The component 80 may of course be an integral part of the body portion 14. Equally the position of the lugs and the recesses could be reversed with the lugs being carried on the body portion.

FIG. 9 shows a further embodiment with a modified top portion 100 to the body portion 102. The top portion 100 forms a cap extending laterally over the gap 104 between each arm portion 106 and the body portion 102. The gap 104 is needed to allow the arm portions 106 to be deformed, but the cap ensures that small fingers and other items cannot enter the gaps 104. In this way risk of crushing is eliminated as is risk of jamming.

As well as applications in attaching items to the frames of pushchairs, the fastener is suitable for attaching the cot or seat part to such frames. The simplified nature of the fastening allow the seat/cot to be removed and reinserted into the frame as required.

The fastener also has application in attaching items to car seats (particularly child car seats).

A further fastener according to the invention, a modified version of the first embodiment described in detail above, is illustrated in FIGS. 10 to 14. Similar components in this embodiment are allocated equivalent numerals to those in the first embodiment, but with the number increased by 200.

As illustrated in FIG. 10, the assembled system is formed of a male component 202 inserted in a female component 204. The grip portions 229 are visible on the male component 202 together with an end cap 320 which serves to close off the gap between the arm portions and body portion 214 when viewed from above. In the fastened position the grip portions 229 surround the body portion 214 to fully enclose the gap between the arm portions and the body.

In the cross sectional view of FIG. 12 the outline of the cup 234 and the apertures 240 in it can be seen. A stop member 322 is provided at the bottom of the cup 234 to restrain further downward movement of the male member 202 into the cup 234.

The male component 202 is formed of an end cap 320 connected to an additional body component 324 which engages with a protrusion provided on the hollow body portion 214. From the lower end of the body portion 214 arm portions 218 depend formed of stems 222 which carry wedge elements 224 which engage with apertures 240 in the cup element 234. The arms are of non-even cross-section to facilitate bending.

The exploded perspective view of FIG. 14 clearly illustrates the structure of the female component 204, male component 202 and additional body component 324 which is mounted on the male component 202 to form the overall male component.

The male component is provided with substantially flat bulge portions 216 on the hollow body portion 214. The sides of the bulges 216 carry small protrusions 326 which upon insertion of the male component 202 into the female component 204 cooperate with the inside opposing surfaces of ribs 328. The protrusions may be rounded or elongate. The reduced contact arising from the protrusions 326 running on the ribs 328 reduce the risks of sticking and also reduces relative movement between the male and female components.

The upper portion of the hollow body member 214 is provided with a protruding element 330 which carries a lug 332. The protruding element 330 engages with a recess 334 in the underside of additional body component 324. The lug 332 engages with aperture 336 in the additional body component 324. The bulge 338 provided thereon is flush with the bulge 216 on the hollow body member 214 in the assembled state.

The additional body component 324 ends in end cap 320 which extends across the gap between the body portion 214 of the male component 212 and the body portion 340 of the additional body component 324 to the arm portions 218 and grip portions 229.

Elongate pins 292 on the grip portions cooperate with recesses 290 to restrain undesired movement of the arms.

As well as being received in a flush manner within a tubular framework of an article, the male of female components can be provided flush in a variety of other ways.

A further embodiment featuring a flush second component is illustrated in FIG. 15. Here a bracket unit 400 is provided on linking two tubular elements 402, 404 to one another. Mounted on the side of the bracket element is a unit 406 which comprises a recess 408 for receiving the first male component 202. A recess 410 is provided in the two narrow walls of the recess 408 to cooperate with the retaining elements 224 on the first component 202. Additional body component 324 is also illustrated.

As well as providing a readily introducible and releasable fastener system it is also desirable in certain circumstances to provide a tamper resistant function to the assembly. This can be achieved by a variety of means which interfere with the movement of the arm portions/grip portions from the engaged position to a state in which the male component is released from the female, for instance. A variety of such possibilities are illustrated in FIGS. 16a to 16e.

Figure 16A:
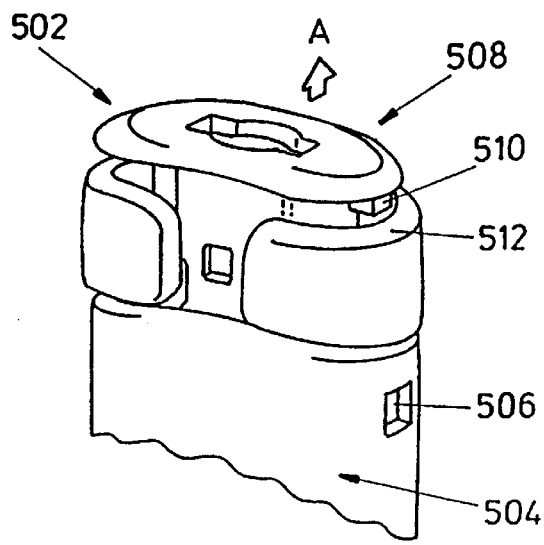

In FIG. 16a a male component 502 is shown attached to a female component 504.

The wedge on the arm portions of the male component 502 is engaged with aperture 506 in the wall of the female component 504 in the engaging state.

As illustrated here, however, the end cap 508 has been lifted slightly in the direction of arrow A away from the female component 504. This sliding movement of the cap 508 and the part of the body associated with it relative to the remainder of the male component 502 has resulted in the elevation of a block 510 carried on the end cap 508 to a position above the top of the grip portions 512. As a result of this the grip portions 512 can now be moved together to release the male component 502 from the female 504.

With the block portion 510 recessed below the level of the grip portions 512 their inward movement is restrained by engagement of their inner face with the outer face of the block 510.

Figure 16B:
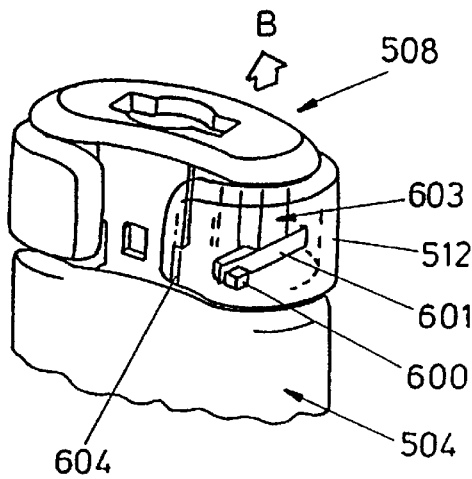

In the alternative embodiment of FIG. 16b the progress of pins 600 on the grip portions 512 into the recesses 604 so as to allow the arms to move and the male and female components to disengage is restrained by the abutment of the pins 600 on wall element 601. The wall element is dependent from bar 603 and is lifted out of the way of the pins 600 by upward movement, arrow B, of the end cap 508 as a result.

Figure 16C:
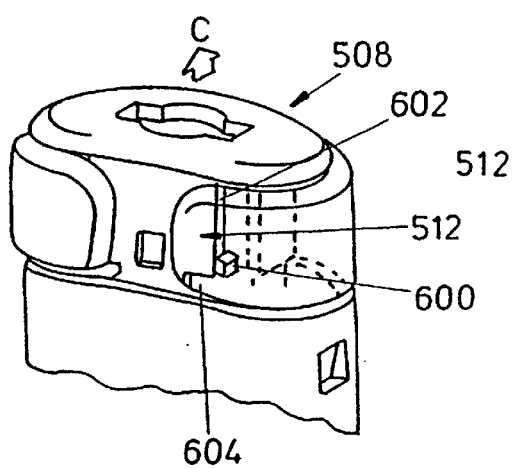

A still further embodiment is illustrated in FIG. 16c. In this case the movement of the grip portions 512 is restrained as shown by the engagement of pins 600 provided thereon with a wall portion 602 on the slidable end cap 508. Sliding the cap up, arrow C, allows access for the pins 600 to the recess 604 so allowing the grip portions 512 to be pushed together and release the male and female components.

Figure 16D:
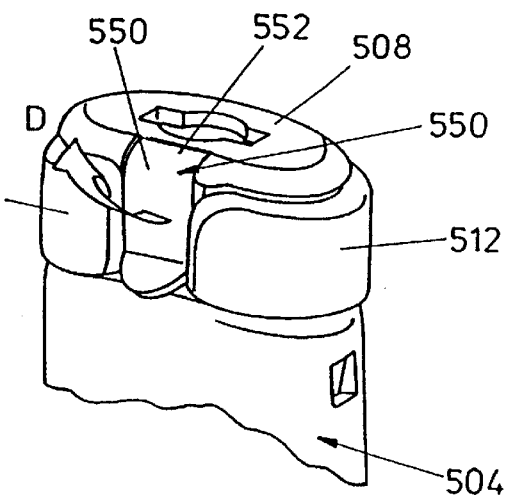

In the embodiment of FIG. 16d compression of the grip portions 512 together is resisted in the position shown by the presence of a flap element 550 between the ends of the grip portions 512. This element 550 is mounted on the end cap 508 by means of a hinged linkage 552. By pivoting the element 550 upwards arrow D, the element 550 can be removed from between the two grip portions 512 and their depression together is possible. Release of the male component from the female is then possible.

Figure 16E:
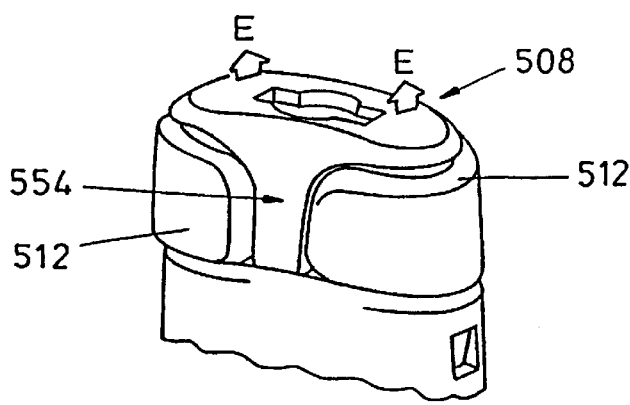

A still further embodiment is illustrated in FIG. 16e where on the male component the entire end cap 508 is slid up in the direction of arrows E so as to remove the element 554 from between the grip portions 512. Once again male release from the female is then possible.

What is claimed is:

1. A fastener comprising a first component and a second component, the two components having a first released state and a second engaged state, wherein a portion of the first component is deformed relative to the remainder of the first component during the transition from first to second state, the deformed portion returning towards its original position in the second state to retain the first and second components together, the first component comprising a body portion and one or more dependant arm portions, the body portion having an inserted end and a non-inserted end, the one or more arm portions depending from the inserted end of the body portion inserted into the second component to provide a gap into which the one or more arm portions can be deformed, the gap extending from a lead end adjacent the inserted end of the body portion to a non-lead end, and the first component being provided with a grip portion on each arm portion, the grip portions surrounding the body portion to overhang a non-lead end portion of the gap between the arm portions and the body portion.

2. A fastener according to claim 1 in which the one or more of the arm portions are provided with means which cooperate with the body portion of the first component or a portion depending therefrom, wherein the means comprise one or more pins or lugs which cooperate with one or more recesses or grooves in the first component.

3. A fastener according to claim 2 in which the one or more lugs or pins are free to move within the one or more recesses or grooves during deformation of the one or more arm portions away from the first state position to the second state position and the one or more lugs or pins cooperate or engage with the boundary of the one or more recesses or grooves to restrain undesired movement of the one or more arm portions away from the body portion, beyond the first state position.

4. A fastener according to claim 1 in which the transition from first to second state is effected by sliding the first and second components relative to one another, the relative sliding causing the one or more arm portions to deflect towards the body portion.

5. A fastener according to claim 1 in which the first and second components are lockable together in the second state.

6. A fastener according to claim 1 in which the first or second component are provided as an integral part of nursery equipment.

7. A fastener according to claim 6 in which the nursery equipment is a high chair, pushchair, or playpen.

8. A fastener according to claim 1 in which the transition from second to first state is achieved by one hand of a user.

9. A fastener according to claim 1 wherein the body portion of the first component is provided with an end cap which serves to close off the gap between the one or more arm portions and the body portion when viewed from above, in which the end cap outer limit extends beyond the surface of the dependent arms which opposes the body portion.

10. A fastener according to claim 1 wherein the body portion of the first component is provided with an end cap which serves to close off the gap between the one or more arm portions and the body portion when viewed from above, in which the end cap extends laterally over the gap between the one or more arm portions and the body portion.

11. A fastener according to claim 1 in which the grip portions are curved around a portion of the arm portion on which the grip portion is provided.

12. A fastener comprising a first component and a second component, the two components having a first released state and a second engaged state, wherein a portion of the first component is deformed relative to the remainder of the first component during the transition from first to second state, the deformed portion returning towards its original position in the second state to retain the first and second components together, the first component comprising a body portion and one or more dependant arm portions, the body portion having a lead end and a non-lead end, the one or more arm portions extending from and along side the lead end toward the non-lead end of the body portion, at least a portion of the arm portions and lead end of the body portion are configured to be inserted into the second component, wherein one or more of the arm portions are provided with means which cooperate with the body portion of the first component, wherein the means are selected from one or more pins or tugs which cooperate with one or more recesses or grooves in the first component and one or more recesses or grooves which cooperate with one or more pins or lugs in the first component, in which the one or more pins or tugs cooperate or engage with a boundary portion of the recesses or grooves to restrain a desired movement of the one or more arm portions away from the body portion.

13. A fastener according to claim 12 in which the fastener is provided with a cap which extends laterally over a gap between the one or more arm portions and the body portion.

14. A fastener according to claim 12 in which the one or more pins or lugs are provided on the one or more arm portions and the respective recess or groove is provided on the body portion of the second component.

15. A fastener according to claim 12 in which the means cooperate with the body portion of the first component directly or a portion depending therefrom.

16. A fastener according to claim 12 in which the one or more lugs or pins are free to move within the recess or groove during the deformation of the arm portions during the transition from the first state to the second state.

17. A fastener according to claim 12 which comprises a pair of pins or lugs and a pair of recesses or grooves.

* * * * *

UNITED STATES PATENT AND TRADEMARK OFFICE
CERTIFICATE OF CORRECTION

PATENT NO. : 6,698,966 B2
DATED : March 2, 2004
INVENTOR(S) : Kevin Hilton et al.

It is certified that error appears in the above-identified patent and that said Letters Patent is hereby corrected as shown below:

Column 6,
Line 41, please delete "pAccording" and replace with -- According --.
Line 41, please begin a new paragraph with -- According --.

Column 14,
Lines 51 and 54, please delete "tugs" and replace with -- lugs --.

Signed and Sealed this

Third Day of August, 2004

JON W. DUDAS
*Acting Director of the United States Patent and Trademark Office*